United States Patent Office.

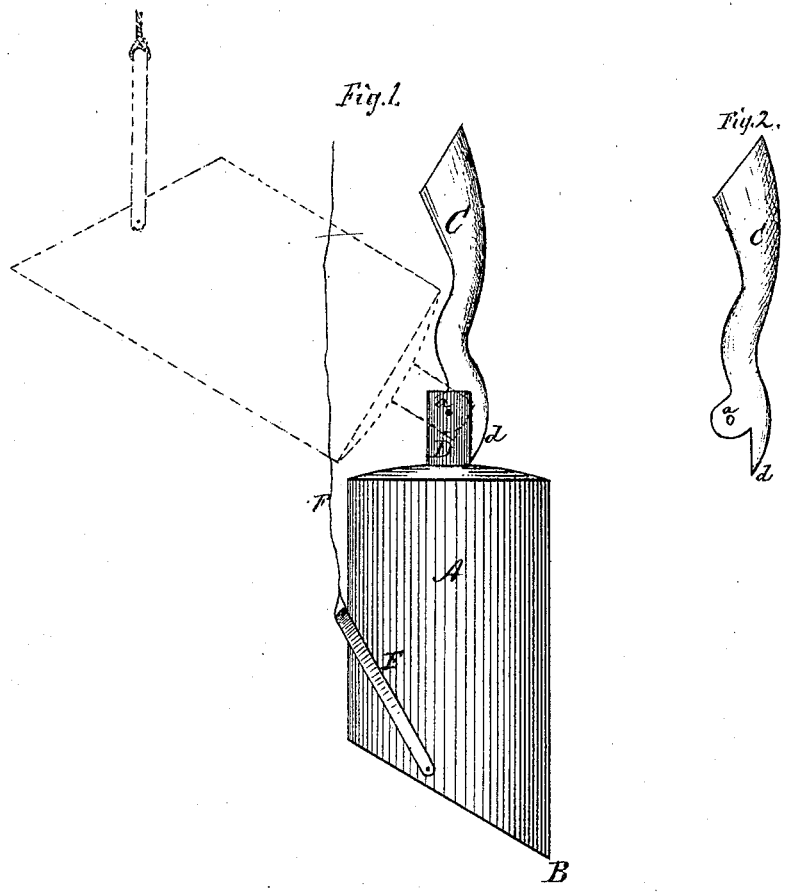

OSCAR P. KNIFFIN, OF CLINTON, CONNECTICUT, ASSIGNOR TO HIMSELF AND H. A. LYNE, OF SAME PLACE.

Letters Patent No. 109,132, dated November 8, 1870.

IMPROVEMENT IN EXCAVATING-SCOOPS.

The Schedule referred to in these Letters Patent and making part of the same.

*To all whom it may concern:*

Be it known that I, OSCAR P. KNIFFIN, of Clinton, in the county of Middlesex and State of Connecticut, have invented a new Improvement in Excavating-Scoop; and I do hereby declare the following, when taken in connection with the accompanying drawing and the letters of reference marked thereon, to be a full, clear, and exact description of the same, and which said drawing constitutes part of this specification, and represents in—

Figure 1, a side view, with the operation denoted in broken lines; and in

Figure 2, the handle, detached.

This invention relates to an improvement in scoops designed for excavating or cleaning out wells, which are formed by sections of tubes set into the earth, by removing the earth from below.

Heretofore, this class of wells have been made of sufficient diameter to allow a man to work within the tubing, but as a much less diameter would answer all practical purposes, the object of my invention is to produce an instrument by which the earth may be removed without the necessity of a person going into the well.

My invention consists of a shank or handle with a scoop pivoted thereto, the said handle constructed with a bearing, to hold the scoop in a vertical position, yet allow the scoop to be turned for the purpose of elevating the mouth of the scoop when the handle is in a vertical position.

A is the scoop, of any suitable metal and shape, by preference wood, and the edge of the mouth at one point, B, longer than at the other points.

C is a socket or shank, to which the handle is fixed, or made a part of, and to the lower end at *a* the scoop is pivoted, a stud, D, being formed on the head of the scoop for that purpose.

The shank extends below the pivot, so as to form an arm, *d*, against which the stud D bears, to prevent the scoop from turning back, and this arm is upon the longest side of the scoop, the pivot being at right angles to the said longest side.

E is a bail pivoted to the scoop near its mouth, to which a line, F, is fixed, extending up to the operator.

To use the scoop, the operator presses it into the earth in the position denoted in fig. 1, and when pressed down so hard as to be filled with earth, or as full as may be, the operator draws the line F and works the scoop until it is turned into the position denoted in broken lines; then drawing the line and handle together, the scoop, with the contents, is raised to the surface of the earth, emptied, and may be again returned, dropping, by its own gravity, against the arm *d* into position for a second charging, and so on.

This instrument is found very useful in cleaning out wells, as it may be passed down through the water and gather up the mud or sediment in the well, work which now requires a person to descend for that purpose.

I claim as my invention—

The scoop A, combined with the shank C and pivoted thereto, the said shank constructed with an arm, *d*, bearing upon the scoop below the pivot, in the manner and for the purpose substantially as described.

OSCAR P. KNIFFIN.

Witnesses:
GEO. E. ELLIOT,
C. C. WATROUS.